May 20, 1958      B. W. OSWALT      2,835,111
HYDRAULIC BRAKE ADJUSTER
Filed Sept. 30, 1954
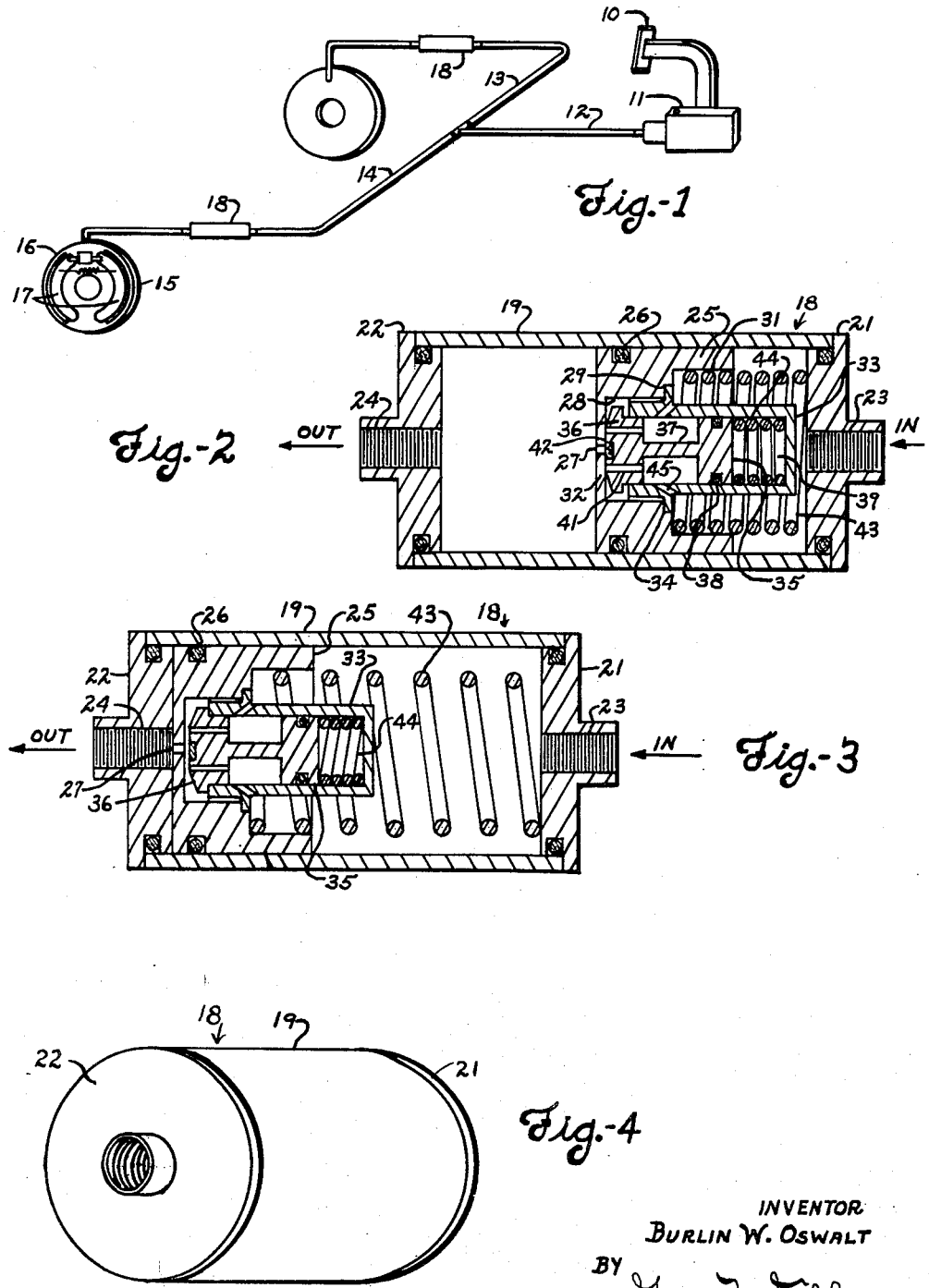
INVENTOR
BURLIN W. OSWALT
BY Tom Walker

United States Patent Office 2,835,111
Patented May 20, 1958

2,835,111

HYDRAULIC BRAKE ADJUSTER

Burlin W. Oswalt, Union, Ohio

Application September 30, 1954, Serial No. 459,374

12 Claims. (Cl. 60—54.5)

This invention relates to hydraulic systems, and particularly to hydraulic adjusting mechanisms for hydraulic actuating cylinders wherein it is desired to automatically adjust the starting position of an extensible piston therein so as to compensate for variations in the required travel of the piston.

The invention is particularly applicable, although not limited, to hydraulic brake devices. It functions therein to provide automatic compensation for wear of the brake and for relatively unequal rates of heat induced expansion as between the brake shoes and brake drum, so as to avoid softness in the brake and binding or dragging thereof.

The object of the invention is to simplify the construction and operation of automatic hydraulic adjusters, whereby such adjusters may not only be economically manufactured but will be more efficient and satisfactory in use, adaptable to a wide range of applications, and be unlikely to get out of repair.

A further object of the invention is to provide a generally new hydraulic cylinder of the kind described which may be interposed easily and without special skill in the lines of hydraulic braking systems between the master cylinder and the respective brake assemblies.

Another object of the invention is to obtain in a device of the kind described particular improvement in simplicity of construction and reliability of operation.

A further object of the invention is to distinguish between increases in brake clearance resulting from wear and those resulting from expansion according to a novel concept wherein the liquid link between the adjusting cylinder and the brake shoes is lengthened in a uniform manner irrespective of the cause of clearance but is permitted to shorten when such clearance is the result of heat expansion rather than of wear.

Still another object of the invention is to provide an adjusting cylinder of the kind described of general utility and one which can be installed with equal facility in existing hydraulic systems and in newly constructed systems.

A further object of the invention is to provide an apparatus of the type described herein possessing the advantageous features, the inherent meritorious characteristics and the mode of operation herein described.

With the above primary and other incidental objects in view as will more fully appear in the specification, the invention intended to be protected by Letters Patent consists of the features of construction, the parts and combinations thereof, and the mode of operation, as herein described or illustrated in the accompanying drawings, or their equivalents.

Referring to the accompanying drawing, wherein is found one but obviously not necessarily the only form of embodiment of the invention.

Fig. 1 is a diagram of a braking system showing the adjusting device in accordance with the illustrated form of the invention embodied therein;

Fig. 2 is a longitudinal sectional view of the hydraulic adjusting cylinder in accordance with the illustrated form of the invention;

Fig. 3 is a view similar to Fig. 2 showing the piston in operated position; and

Fig. 4 is a perspective view of the adjusting cylinder.

Like parts are indicated by similar characters of reference throughout the several views.

Referring to the drawing, a braking system may include a brake pedal 10, the depression of which exerts pressure on hydraulic fluid in a master cylinder 11. The cylinder 11 is connected by a conduit 12 and branches 13 and 14 thereof to wheel braking assemblies 15, each including in part a drum 16 and shoes 17. Pressure applied within the master cylinder 11 is transmitted to the wheel braking assemblies by the conduits 12, 13 and 14, and is there utilized in a conventional manner to spread apart the shoes 17 to effect a frictional contact thereof with the drum 16. The shoes 17 tend normally to be retracted from the drum 16 by spring means, and upon release of the pedal 10 such means is effective to move the shoes out of contact with the brake drum and to return through the conduits 13, 14 and 12 hydraulic fluid previously displaced by actuation of the pedal.

It is here proposed to install in such a system adjusting cylinders 18 in each line to a braking assembly. Such devices function to obtain the proper and necessary movement of the brake shoes into engagement with the brake drum, with a uniform substantially constant travel of the pedal 10 irrespective of wear, and to obtain a compensation for heat expansion in the braking assemblies which is effective only when required.

The several cylinders 18 are identical in construction and operation so that a description of one will suffice for all. Thus, and referring to Fig. 2, each such cylinder comprises an outer cylinder 19, the ends of which are closed by caps 21 and 22. In each are respective longitudinal openings 23 and 24 internally threaded to facilitate installation of the unit in a hydraulic line, as in a line 13 or 14. Further, the cylinder is so arranged that the opening 23 serves as the inlet and the opening 24 as the outlet. Installed in accordance with the diagram of Fig. 1 the cylinder would be so arranged that the opening 23 receives hydraulic fluid from the cylinder 11 while the opening 24 discharges fluid toward the braking assemblies 15.

Within the cylinder 19 is an outer main piston 25 in sliding contact with the internal wall of the cylinder and mounting a peripheral ring seal 26 substantially precluding the passage of fluid from end to end of the cylinder around the piston. Within the piston 25 is a central axial port 27 and counterbores 28, 29 and 31 of successively greater diameter facing or opening through the piston toward the inlet opening 23. The counterbore 28 in effect defines in the piston 25 a wall 32 in which the port 27 appears as a relatively small diameter opening communicating the counterbore 28 with the interior of the cylinder 19 between piston 25 and outlet opening 24. An auxiliary cylinder 33, open at one end and closed at the other, is installed in the piston 25 for unison motion therewith. Thus, near its open end the exterior of the member 33 is threaded and turned into engagement with corresponding internal screw threads on the wall of counterbore 28 until a flange 34 on the member 33 seats in the bottom of counterbore 29.

Slidably mounted in the auxiliary cylindrical member 33 is a piston assembly including a piston portion 35 and a valve portion 36 rigidly interconnected in longitudinally spaced relation by an integral rod 37. The piston portion 35 has a sliding fit in the member 33 and mounts a sealing ring 38 in its periphery which in effect defines between such piston portion and the closed end of the member 33 an air cushion or dashpot chamber 39. The valve portion 36 also is slidably mounted in the member 33 but is formed with cut-away areas or passages 41 establishing free communication on opposite sides thereof.

The portion 36 is extensible through the open end of the cylindrical member 33 into abutting relation with the wall 32. The mounting of the cylindrical member 33 is coaxial with respect to the port 27 so that the valve portion 36 may cover and thereby close the relatively small diameter opening which the port 27 presents. For more effective sealing of such opening the front surface of the valve portion 36 may, as shown, have recessed therein a rubber or rubber-like sealing disc 42.

The piston assembly comprising a piston 25 and parts supported thereby is limited in its movement in one direction by engagement of the main piston with the end cap 22. Motion in the opposite direction is limited by engagement of the closed end of the cylindrical member 33 with the end cap 21. A compression spring 43 is received in the counterbore 31 and based on the end cap 21 to cause the piston assembly to normally occupy a slightly forward position in the cylinder. Further, a spring 44 may be placed in the air chamber 39 to assist in opposing inward movement of the piston portion 35. Such inward movement, as will be seen, is a function of hydraulic pressures applied through the port 27 and in the interior of the cylinder 33 by way of openings 45 therein which communicate the interior of the auxiliary cylinder 33 between the valve and piston portions 35 and 36 with the counterbore 31 and thereby with the interior of the cylinder 19 between piston 25 and inlet opening 23.

It will be understood that the system to either side of the piston 25 is in operation filled with a hydraulic fluid or oil. The application of pressure upstream of the piston, as by depression of the pedal 10, raises the pressure in cylinder 19 between the piston 25 and inlet opening 23. This pressure is effective over the entire exposed area of the piston and the piston moves relatively quickly in a leftward direction in the cylinder or toward the outlet opening 24, displacing oil from the cylinder by way of opening 24. The pressure downstream of the piston accordingly also is elevated, resulting in the desired actuating movement, as for example the spreading of the shoes 17 into contact with the drum 16. When this contact is made the downstream pressure rises to equal that upstream of the piston 25 and motion of the piston accordingly is halted. Now, when the applied pressure upstream of the piston is released, the over balancing pressure to the left of or downstream of the piston 25 effects a return movement thereof which is continued by virtue of the contracting spring means in the wheel braking assemblies until the parts have returned to a normal starting position.

In the course of a typical operation as described the pressure within cylindrical element 33, which is the pressure prevailing in or on the inlet side of the piston 25, may act upon piston portion 35 to move valve portion 36 to open port 27, but in a stabilized operation as described no flow through the port 27 occurs and the valve portion 36 closes immediately as soon as the inlet pressure is released. In the event, however, that the piston 25 is permitted to travel into contact with the end cap 22 without encountering a balancing downstream pressure, as may result from wear or from heat expansion, it will be apparent that the pressure applied to piston portion 35 in cylinder member 33 through openings 45 will be effective to move valve portion 36 to open position relatively to the port 27 and that fluid flow will take place from the inlet side of the piston 25 to the outlet side thereof by way of the port 27. The liquid link downstream of the cylinder thus is lengthened and fluid continues to be added until a condition of pressure balance obtains. Since the valve portion 36 acts to close the port 27 immediately that the inlet pressure is released then the added fluid will remain downstream of the piston throughout continued operation since the brake shoes 17 will clear the drum 16 before or at about the same time as the piston 25 is fully retracted in the cylinder 19.

In the case of fluid added to compensate for heat expansion, however, a cooling of the brake assembly will require that a retracting stroke of the brake shoes be of greater than normal extent, corresponding to the previous spreading action of the shoes of greater extent, in order for the shoes properly to clear the drum. Thus, as the shoes retract, the piston 25 may reach the limit of its retracting movement before the brake shoes have cleared the brake drum. Then as the brake drum cools to its original size it may shrink and exert intense constricting force on the brake shoes and thereby effect a corresponding pressure increase in the fluid link into the outlet chamber and against the left hand or outlet end of the piston 25 and such pressure applied through the port 27 is effective to move the valve and piston assembly comprising portions 35 and 36 rightward in the cylinder member 33 to open the port 27 and permit a return flow of fluid from the outlet side of the piston 25 to the inlet side thereof. Thus pressure in the fluid link resulting from the shrinkage of the drum is relieved and the brake shoes are retracted to a position where they are in light dragging contact with the drum. The desired brake shoe release clearance may thereafter be re-established by merely depressing the brake pedal after the brake is cooled. When the fluid in the inlet and outlet chambers of cylinder 19 is pressurized by the brake pedal under these latter conditions, there will be no substantial initial displacement of the piston assembly 25 resulting from the pedal movement because the brake shoes are already in contact with the brake drum. The movement of the pedal merely brings about equalized or balanced pressure in the inlet and outlet chambers on opposite sides of the piston assembly. However, the pedal movement quickly raises the pressure in the inlet chamber to a value sufficient to open valve 36. Then, notwithstanding the fact that the fluid pressure on opposite sides of the piston assembly 25 is balanced, since valve 36 is open the piston assembly 25 is movable leftward through cylinder 19 by the axial expansion of spring 43. Spring 43 thus urges the piston assembly 25 forward toward its leftward position on end cap 22 (Fig. 3) and as the assembly moves in this direction fluid from the outlet chamber spills backward through the open port 27 and around valve 36 into the inlet chamber. When the pedal is thereafter released, valve 36 snaps shut and the brake shoe springs cause the full retraction of the piston assembly to its Fig. 2 position. Thus the desired release clearance is re-established for the brake shoes.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. In a hydraulic cylinder, a piston slidable in said cylinder and defining at opposite ends thereof inlet and outlet chambers, said cylinder having corresponding openings communicating with said chambers, a port in said piston intercommunicating said chambers, a counterbore in said piston facing said inlet chamber and surrounding said port, an auxiliary cylinder having one end open, said open end being received in said counterbore and rigidly connected to said piston, and a supplemental piston in said auxiliary cylinder movable in response to a predetermined pressure of fluid in either of said chambers thereof and having a portion to open and close said port in response to such movement.

2. In a hydraulic cylinder, a piston slidable in said cylinder and defining at opposite ends thereof inlet and outlet chambers, said cylinder having corresponding openings communicating with said chambers, a port connecting said chambers, a valve for opening and closing said port, said valve closing toward said outlet chamber and opening in response to a predetermined high pressure in said outlet chamber, and a piston connected to said valve for opening said valve in response to a predetermined high pressure in said inlet chamber.

3. Hydraulic brake adjusting means, including a cylinder, a piston slidable therein and defining at opposite ends thereof inlet and outlet chambers, said cylinder having corresponding openings communicating with said chambers, a port in said piston connecting said chambers, an auxiliary cylinder installed in and movable with said piston, a piston reciprocable in said auxiliary cylinder, openings in said auxiliary cylinder communicating said inlet chamber with the interior of said auxiliary cylinder on one side of the piston therein, and a valve connected to said last mentioned piston controlling flow through said port.

4. Hydraulic brake adjusting means, including a cylinder, a piston slidable in said cylinder and defining inlet and outlet chambers at opposite ends thereof, said cylinder having corresponding openings communicating with said chambers, a port in said piston, an auxiliary cylinder having one end open and one end closed to fluid in said chambers installed in said piston with the open end received therein in line with and communicating with said port and the closed end projecting into said inlet chamber, a piston received in said auxiliary cylinder, openings in said auxiliary cylinder admitting pressure fluid from said inlet chamber to the interior of said auxiliary cylinder between the open end thereof and said piston therein, and a valve connected to and forming a part of said last mentioned piston and movable therewith to open and closed positions relatively to said port.

5. Hydraulic brake adjusting means according to claim 4, characterized by resilient means in the closed end of said other cylinder acting on said last mentioned piston in opposition to pressure fluid admitted to said other cylinder.

6. Hydraulic adjusting mechanism comprising a casing member, an actuated member movable in said casing member in sealing engagement with the interior of the casing member and defining with the casing member a first chamber to receive fluid for actuating said actuated member and a second chamber to contain fluid displaceable by the actuated member, a port connecting said chambers, and valve means for said port including means biasing said valve means toward a position to close said port and said valve means being operable to open in response to a predetermined pressure in said second chamber, and said valve means having an effective actuating surface responsive to a predetermined pressure of the fluid in said first chamber when the port is closed to open said valve means.

7. Hydraulic adjusting mechanism comprising a casing member, an actuated member movable in said casing member in sealing engagement with the interior of the casing member and defining with said casing member a first chamber to receive fluid for actuating said actuated member and a second chamber to contain fluid displaceable by the actuated member, spring means biasing said actuated member against fluid contained in said second chamber, a port connecting said chambers, and valve means for said port including means biasing said valve means toward a position to close said port and said valve means being operable in response to a predetermined pressure in said second chamber, and said valve means having an effective actuating surface responsive to a predetermined pressure of the fluid in said first chamber when the port is closed to open said valve means.

8. In a hydraulic adjusting mechanism a cylinder, a main piston in said cylinder defining with the cylinder inlet and outlet chambers, a spring biasing said main piston against fluid in said outlet chamber, a port through said main piston connecting said chambers, an auxiliary cylinder in said main piston communicating with said port and having one end closed to fluid in said chambers, a supplemental piston in said closed end of the auxiliary cylinder having a valve portion for opening and closing said port and having means for biasing the supplemental piston to urge said valve portion toward a closed position on said port, said supplemental piston having an effective actuating surface responsive to a predetermined pressure of fluid in said inlet chamber when said valve portion is closed on said port to overcome said valve bias means to open said port, and a passage opening into said auxiliary cylinder from said inlet chamber to communicate inlet fluid to said actuating surface of said supplemental piston when the valve portion is closed on said port.

9. In a hydraulic cylinder, a piston slidable in said cylinder and defining at opposite ends thereof inlet and outlet chambers, said cylinder having corresponding openings communicating with said chambers, said piston having a port therein, an auxiliary cylinder installed in and movable with said piston, said auxiliary cylinder having a closed end and an open end, the latter being received in the side of said piston facing said inlet chamber in closing relation to said port, said auxiliary cylinder having an opening therein providing communication between said chambers by way of said auxiliary cylinder and said port, a valve movable in said auxiliary cylinder to seat on said piston to close said port, a piston in said auxiliary cylinder connected to said valve and urged by the pressure in said inlet chamber in a direction to unseat said valve, said valve being exposed to the pressure in said outlet chamber through said port to tend to unseat said valve when the pressure in said outlet chamber exceeds a predetermined amount, and resilient means in said auxiliary cylinder opposing unseating of said valve.

10. In a hydraulic cylinder, a piston assembly reciprocable in said cylinder including an outer piston having a port therein, a counterbore opening through one end of said piston and providing at the bottom thereof a valve seat in surrounding relation to said port, an auxiliary cylinder installed in said counterbore and having an open end received in said piston in enclosing communicating relation with said port, the opposite end of said auxiliary cylinder being closed, a valve slidably mounted in the open end of said auxiliary cylinder for seating on said valve seat to close said port, a piston slidably mounted in the said opposite end of said auxiliary cylinder and connected to said valve, and an opening in said auxiliary cylinder to the exterior thereof intermediate said valve and said piston, said valve being constructed for free flow of fluid therearound and through said port in its unseated position and said piston having a relatively close fit in said auxiliary cylinder to define an air cushioning chamber in the said opposite end thereof.

11. Hydraulic adjusting mechanism comprising a cylinder, a main piston therein defining with said cylinder axially spaced fluid chambers, said main piston having a forward face and a rearward face adapted for communication respectively with fluid in the chambers adjacent said faces, a spring biasing said main piston toward fluid in the chamber adjacent said forward face, an auxiliary cylinder within said main piston having one end portion closed to fluid in either of said chambers, a port through said piston from said forward face and opening into said auxiliary cylinder, a supplemental piston in said auxiliary cylinder having a valve portion adapted for closing said port, said supplemental piston being reciprocable in said closed end portion of said auxiliary cylinder in fluid tight engagement therewith, means for biasing said supplemental piston to urge its valve portion toward a position to close said port, an actuating surface on said supplemental piston responsive to fluid pressure to displace said supplemental piston to overcome said valve bias means, and a passage opening into said auxiliary cylinder from said rearward face of the main piston to communicate said actuating surface with fluid acting against said rearward face of the main piston when said port is closed, said supplemental piston being operable in response to a predetermined pressure of fluid acting on said rearward face of the main piston to open said port and thereby intercommunicate fluid acting on said forward and rearward faces of the main piston.

12. Brake adjusting mechanism comprising a cylinder, a main piston in said cylinder having a forward face adapted to communicate with fluid forming a fluid link with a fluid motor for a brake and said main piston having an opposing rearward face adapted to communicate with brake-actuating fluid from a fluid pressure generator, a port connecting fluid adjacent said forward and said rearward faces, valve means and means biasing said valve means toward a closed position to seal said port during the stroke of said main piston, said valve means being operable to open said port in response to a predetermined pressure of said fluid acting on either of said opposing faces of the piston to provide communication between said fluid on said opposing faces of the piston, and spring means acting while said valve is open to displace said main piston axially relative to the cylinder and provide for flow of said fluid through said port in a direction counter to the direction of said piston displacement to vary the volume of fluid in said fluid link and thereby adjust the brake motor.

References Cited in the file of this patent

UNITED STATES PATENTS

| | | |
|---|---|---|
| 2,385,625 | Hopmans | Sept. 25, 1945 |
| 2,544,849 | Martin | Mar. 13, 1951 |
| 2,551,081 | Alvarez | May 1, 1951 |
| 2,591,793 | Dubois et al. | Apr. 8, 1952 |